United States Patent [19]

Jeskey

[11] Patent Number: 4,533,210
[45] Date of Patent: Aug. 6, 1985

[54] OPTICAL FIBER LIGHT FILTER USING ELONGATED RADIATION ABSORBING ELEMENTS

[75] Inventor: Richard V. Jeskey, Southbridge, Mass.

[73] Assignee: Incom, Inc., Southbridge, Mass.

[21] Appl. No.: 497,665

[22] Filed: May 24, 1983

[51] Int. Cl.$^3$ ............................................. G02B 5/172
[52] U.S. Cl. ............... 350/96.30; 350/96.27; 350/320
[58] Field of Search ............... 350/96.10, 96.15, 96.30, 350/96.33, 96.34

[56] References Cited

U.S. PATENT DOCUMENTS

| | | | |
|---|---|---|---|
| 3,469,026 | 9/1969 | Winik et al. | 178/6.8 |
| 3,549,233 | 12/1970 | Eaglesfield et al. | 350/96.33 |
| 3,760,179 | 9/1973 | Addington, Jr. | 240/106 R |
| 3,814,498 | 6/1974 | Tomlinson, III et al. | 350/96 WG |
| 3,870,399 | 3/1975 | Randall et al. | 350/96 B |
| 4,139,262 | 2/1979 | Mahlein et al. | 350/96.33 |
| 4,406,973 | 9/1983 | Stowe | 313/541 |

*Primary Examiner*—John Lee
*Assistant Examiner*—Lester Rushin

*Attorney, Agent, or Firm*—Blodgett & Blodgett

[57] ABSTRACT

A radiation conducting conduit functions as an off-axis filter and contrast enhancer for an imaging device. A core of transparent glass has an axis aligned with the line of sight of the device. Cladding is provided which has the same index of refraction and co-efficient of thermal expansion as the core glass, except that a small percentage of the cladding glass is made of thin fibers or leaves of absorbing glass aligned substantially radially to the axis of the conduit and distributed randomly in the volume of the cladding. The interface between the core glass and the cladding glass of the same composition does not involve reflection or refraction, and non-axial light passes through the interface and is trapped among the absorbing black fibers. There, it is reflected and diminuated until it is totally absorbed. The conduit may be formed by the steps of: forming a flat sheet of glass containing random parallel fibers or leaves or absorbing glass, cutting the sheet into beveled strips, assembling the strips into a cylindrical configuration with the absorbing elements extending radially of the axis, inserting a core of transparent glass, and fusing the assembly and core together.

12 Claims, 11 Drawing Figures

OPTICAL FIBER LIGHT FILTER USING ELONGATED RADIATION ABSORBING ELEMENTS

BACKGROUND OF THE INVENTION

In the fields of fiber optics and lens technology, there exist well developed techniques for enhancing the angular gathering range of radiation, widening the so-called "angle-of-acceptance" of a lens, window, or conduit. Moreover, one focus of these technologies, has been to assure that all accepted radiation, including radiation oblique to the axis of the device, is internally reflected repeatedly to bring it to the detector or receiver.

However, there exist applications which require the detection of radiant energy, especially visible and near-visible light, in which a contrary goal is sought. Exemplary applications are those which involve feeble and distant light sources. The aim is to filter out radiation which is not propagating parallel to the line of sight of the detecting device. These applications include long exposure astrophotography, and closely related methods of navigation and astrogation that make use of the light of feeble stars as a "navigational grid." Other applications concern such low level radiation detection schemes as: night vision for military and police surveillance, high resolution aerial photography, and even studies by biologists of the nocturnal habits of animals.

The devices used in these applications are generally already operating near a fatally low signal-to-noise ratio. A good portion of the optical noise entering such systems is in the form of stray radiation coming, not from the desired target, but from the background. At very low radiation levels, the intensity of this background radiation may equal or exceed that emanating from the target, and will certainly have an adverse effect on image resolution. When the target is illuminated by the observer, as, for example, in infra-red reconnaissance, some filtering of the back-scatter noise can be accomplished by adjusting the system geometry or by "gating" the detector to take advantage of the time difference between back-scatter and light reflected from the target. When naturally occuring low radiation levels are used, however, neither ploy can be effective.

A complex off-axis filter can be designed and constructed which is composed of layers of glass formulations having differing indices of refraction in a gradient which leads away off-axis light rays. Such devices suffer from distortion and breakage due to the differing coefficients of thermal expansion which generally accompanies differing indices of refraction.

Another solution would be to provide a peripheral jacket or cladding of light absorbing material with an index of refraction equal to that of the core of the filter. The problem is that the index of refraction is dependent on the frequency of radiation or light and the variation is not the same for different glass compositions. It is impractical to match indices for clear glass and black or absorbing glass over the frequency spectrum to avoid internal reflection.

These and other limitations of the prior art and alternative devices have been obviated in a novel manner by the present invention.

It is, therefore, an outstanding object of the present invention to provide a radiation conduit which reduces the transmittance of off-axis components of the available radiation.

Another object of the invention is to provide a contrast enhancing component for a low level radiation imaging device.

A further object of the invention is to provide a contrast enhancing aperture for a low level radiation imaging device which allows long term exposure of the detector to radiation from the target without interference from stray radiation.

Another object of the present invention is to provide an off-axis radiation filter having substantially the same coefficient of thermal expansion throughout.

A still further object of the invention is to provide an off-axis radiation filter which is effective for broad bands of frequencies of electromagnetic radiation.

Another object of the invention is to provide an off-axis filter having no expensive and fallible electronic or electromechanical parts.

Another object of the present invention is to provide a contrast enhancing component for a low level radiation imaging device which is simple in construction, inexpensive to manufacture, and capable of long life of useful service with minimum maintenance With these and other objects in view, as will be apparent to those skilled in the art, the invention resides in the combination of parts set forth in the specification and covered by the claims appended hereto.

SUMMARY OF THE INVENTION

In general, the invention consists of an optical conduit having a well-defined axis, and provided with a radiation absorbing means at a peripheral surface, the surface being parallel to the axis. The conduit is adapted to collect radiation impinging on an optical device or detector and to selectively filter out, by absorption at its axial periphery, radiation that propagates in a direction oblique to the axis.

More specifically, a transparent glass core is provided with an axis adapted to be aligned with the line of sight detecting or imaging device. A cladding layer is provided at a periphery of the core, the cladding essentially formed of a glass composition having the same index of refraction and coefficient of thermal expansion as the core glass, thereby forming, with the core, a non-reflecting, non-refracting interface. A small percentage of the cladding is composed of "black" or absorbing glass in the form of fibers or leaves extending from random locations on the core in a direction generally normal to the interface of core and cladding. The absorbing elements have a higher index of refraction than the remainder of the cladding material to promote refraction of the light into the absorbing elements rather than reflection.

The invention also involves a method of forming a cylindrical embodiment of the conduit by the steps of: forming a flat sheet of glass containing random parallel fibers or leaves of absorbing glass, cutting the sheets into several strips, assembling the strips into a cylindrical configuration with the absorbing elements extending generally radially of the axis and the cylinder, inserting a core having the same formulation of glass as the main component of the sheet, and fusing the assembly and core together.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
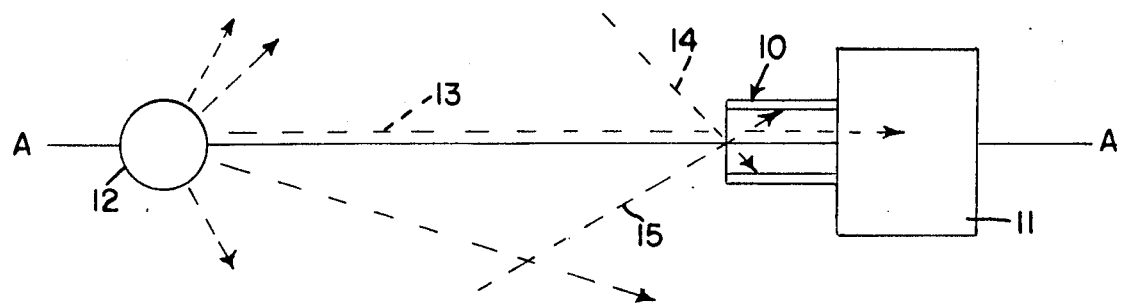
FIG. 1 is a schematic view of a filter embodying the present invention in conjunction with a light detecting device.

Referring first to FIG. 1, wherein the general features of the invention are best seen, an off-axis filter, generally indicated by the numeral 10, is associated with a detecting or imaging device 11. Under conditions of low light level or low radiation level, the imaging device 11 will be provided with means of intensifying the radiation which reaches it. Such image intensifying means are well known, and can be activated by very low levels of light and other radiation. If a light ray model is assumed for the propagation of radiation, it can be seen that a ray 13 parallel to the line of sight A—A from the source 12 to the device 11 is transmitted through the filter 10 without diminuation. Light rays 14 and 15 arriving from the background, and not parallel to the axis A-A are not transmitted by the filter 10 and are neither intensified nor recorded by the imaging device 11.

Figure 2:
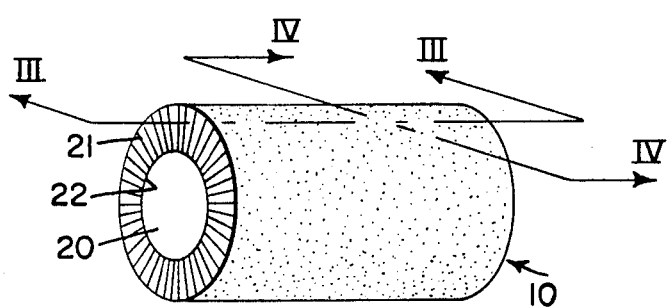
FIG. 2 is a perspective view of an embodiment of the filter in circular cylindrical form.

Referring to FIG. 2, a more specific embodiment of the present invention is depicted. The filter is formed as a cylinder having a core 20 of material transparent to a desired band of radiation, in this case visible or near-visible light. The core is surrounded at its radial periphery by a jacket or cladding 21. The main volume of this cladding is composed of a formulation of glass having the same index of refraction as the core, so that the interface 22 between core and cladding is non-reflecting and non-refracting.

Figure 3:
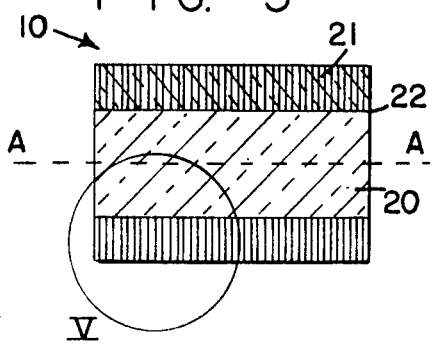
FIG. 3 is a cross-section taken on the line III—III of FIG. 2.
Figure 4:
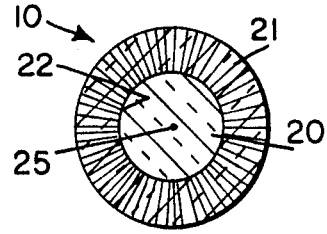
FIG. 4 is a cross section taken on the line IV—IV of FIG. 2.

As is best seen in FIGS. 3 and 4, the cladding 21 is provided with a plurality of light absorbing fibers extending generally radially of the axis A—A (which is indicated in FIG. 4 by the numeral 25). The fibers are thus generally normal to the interface between the core and the cladding. The fibers are optimally formed of material having a high index of refraction relative to the material forming the core and the remainder of the cladding.

Figure 5:
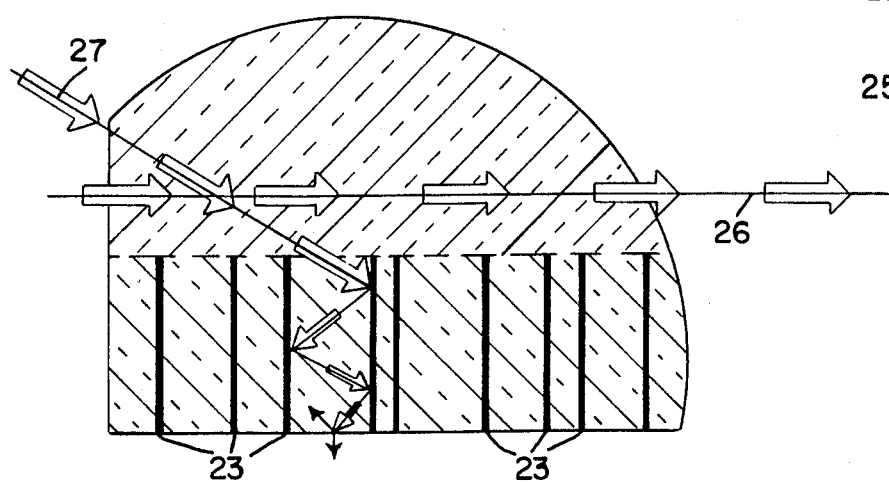
FIG. 5 is a detail of the filter in the area labeled V of FIG. 3 showing the effect of the filter on off-axis and parallel light rays, respectively.

The detail in FIG. 5 indicates the effect of the filter on, respectively, a quantity of light propagating parallel to the axis of the filter, and a quantity of light entering the filter on an oblique angle to the axis. A quantity of light 26 propagating parallel to the axis passes through the transparent core 20 unhindered, with relatively constant intensity, and arrives at the detector 11 to activate it. Because the interface 22 between the core glass and the cladding glass of the same composition does not involve a difference in index or refraction, the quantity of non-axial light 27 passes through the interface without reflection and is trapped among the absorbing fibers 23. At its first interaction with the fibers, the ray is partly absorbed and partly reflected with a net displacement which is radially outward of the core. The next interaction of the ray with a fiber has the same effect. The fraction of the light which is absorbed with each encounter is a function of the index of refraction of the fiber and is preferably enhanced by using fibers with a relatively high index.

It is apparent that the only off-axis light which is not filtered out immediately by a sufficiently long filter incorporating the present invention, is light which reflects off the ends of the black fibers at the interface between core and cladding. It has been found that a relatively ratio of small absorbing fiber volume to cladding volume suffices to absorb off-axis light as described. For example, incorporation of about three percent absorbing fibers by volume satisfactorily absorbs oblique rays. This results in approximately three percent area-to-area ratio between the absorbing fiber ends and the interface 22. The effective amount of off-axis light that is transmitted by reflection from the fiber ends is further decreased; first of all, by absorption at the fiber end, and secondly, by the likelihood that such a beam will be absorbed by its second or a subsequent encounter with the interface of core and cladding. An added advantage of minimizing the volume-to-volume ratio of fibers and cladding is that the problems which would be associated with differential thermal expansion and contraction are likewise minimized, even with fibers whose composition is very ill-matched with the glass of the core and the cladding.

Figure 6:
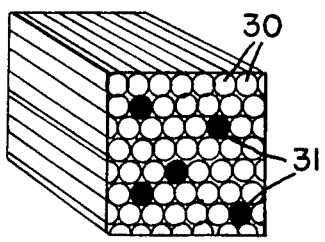
FIGS. 6 and 7 show an end view of a bundle of fibers of clear and absorbing glass before and after the fusing of the bundle into a block.
Figure 7:
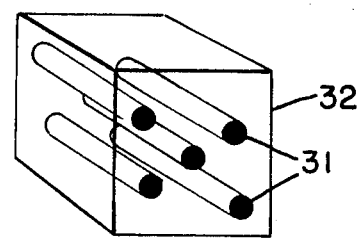
Figure 8:
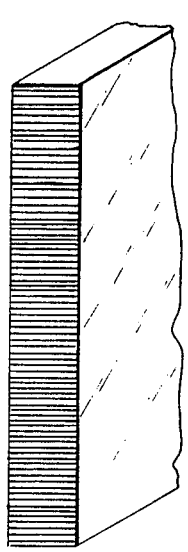
FIG. 8 shows a plate of glass cut from a block with parallel absorbing fibers randomly distributed therein.
Figure 9:
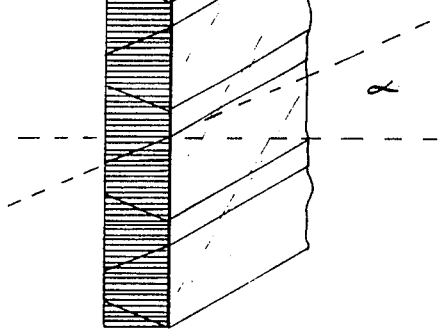
FIG. 9 shows one mode of cutting the plate in strips to form an octagonal cylinder as shown in FIG. 10.

There are a number of ways to form an off-axis filter as described. A practical embodiment may be formed as described below. First, a bundle of unjacketed clear glass fibers is formed, to which are added about three percent absorbing, or black, glass fibers as shown in enlarged detail in FIG. 6. The resulting bundle is then fused into a continuous mass as FIG. 7 shows. The resulting block of glass may be cut into plates by well-known methods. Such a plate is shown in FIG. 8. For some applications, the plate may simply be fused to a flat piece of core glass of the same composition as the clear fibers in the original bundle.

Figure 10:
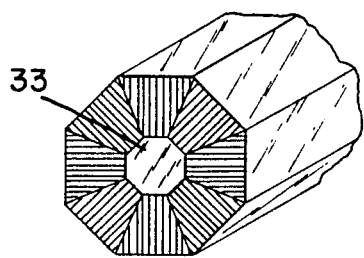

Because the fiber-loaded plate is most easily formed with parallel black fibers, the radial pattern which is ideal for a cylindrical conduit may be approximated by sectioning a plate such as that shown in FIG. 8. As an example, the plate may be periodically cut into strips at an angle alpha α, the angle chosen so that the strips may be assembled into a regular polygonal right cylindrical tube. The angle alpha is chosen, as illustrated in FIG. 10, so that each strip has two converging faces whose planes are at an angle which is an even divisor of 360° (2 pi radians). For instance, if the angle alpha is chosen so that the angle between the faces is 45°, the resulting strips may be assembled into the octagonal cylindrical tube shown in FIG. 10. An appropriately shaped core may be inserted in this step, or preferably the central opening 33 may be bored out into a circular cylindrical shape and a cylinder of core glass closely inserted. The entire assembly may then be fused to form an integral radiation conduit which absorbs off-axis rays.

Figure 11:
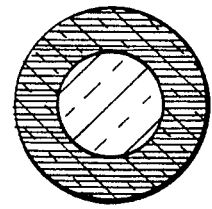
FIG. 11 illustrates a cross section of the article formed by a modified process.

An alternative embodiment of the device may be formed by the following modified steps. The continuous mass or block 32 shown in FIG. 7 may be cut into slabs parallel to the absorbing fibers. From these slabs, right cylindrical tubes may be cut and transparent cores inserted as above. Such a modification presents a cross-section as shown in FIG. 11. Such a structure would be especially appropriate for applications where the ambient radiational noise is expected to be confined essentially to a single plane.

Another approach involves serial layering of clear and black glass to form a cylinder having planar alternate and randomly spaced layers of clear and black glass perpendicular to the axis of the cylinder. A central bore is formed along the axis and filled with clear glass to form the conduit.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Off-axis radiation filter in the form of a faceplate for an optical device, comprising:
   (a) a solid, cylindrical core which is transparent to at least a chosen band of radiation, the core having well-defined axis coincident with the central line-of-sight of the device,
   (b) a layer of cladding having essentially the same index of refraction as the core, the cladding being attached to the core at an interface which is non-reflecting and non-refracting, said interface being parallel to the axis of the core, and
   (c) a plurality of discrete, elongated, radiation absorbing elements embedded in the cladding, said elements extending from the core in a direction generally normal to the interface between the core and the cladding.

2. Off-axis radiation filter as recited in claim 1, wherein the core and the cladding are formed of a glass composition which is transparent to the chosen band of radiation, and the radiation absorbing elements are of glass which absorbs in the chosen band of radiation.

3. Filter as recited in claim 1, wherein the chosen band of radiation is visible light, the core and cladding are transparent glass, and the radiation absorbing elements are of black glass.

4. Radiation filter as recited in claim 1, wherein the radiation absorbing elements are in the form of fibers.

5. Radiation filter as recited in claim 4, wherein said fibers are located randomly in said cladding.

6. Radiation filter as recited in claim 5, wherein said fibers occupy less than 5% of the volume of the cladding.

7. Radiation filter as recited in claim 5, wherein the fibers occupy substantially 3% of the volume of the cladding.

8. Filter as recited in claim 1, wherein said radiation absorbing elements have an index of refraction substantially higher than that of the core and cladding.

9. Off-axis light filter in the form of a faceplate for an optical device, comprising: a transparent glass core of right cylindrical shape, a cladding of glass fused to the core, the cladding glass having essentially the same index of refraction as the core glass, whereby the interface of the core and cladding is non-reflecting and non-refracting, and a plurality of discrete, light absorbing elements embedded in the cladding and extending substantially radially outward from the interface of the core and cladding.

10. Light filter as recited in claim 9 wherein said light absorbing elements comprise a plurality of black glass fibers.

11. A method of forming a light conducting conduit functioning as an off-axis filter, comprising the steps of:
   (a) embedding parallel light absorbing glass elements randomly in a block of clear glass,
   (b) cutting the block of glass into strips so that each strip has two opposed faces, the planes of which converge to an angle 360°/n, where n is an integer,
   (c) forming the strips into a right cylindrical tube, with the light absorbing elements extending generally radially,
   (d) inserting a close-fitting glass core having the same index of refraction as the glass forming the block, and
   (e) fusing the core and strips together.

12. A method as recited in claim 11 additionally comprising the step of: after forming the strips into a right cylindrical tube, boring out of a central opening coaxially with the tube.

* * * * *